United States Patent
Hong et al.

(10) Patent No.: US 9,477,532 B1
(45) Date of Patent: Oct. 25, 2016

(54) GRAPH-DATA PARTITIONING FOR WORKLOAD-BALANCED DISTRIBUTED COMPUTATION WITH COST ESTIMATION FUNCTIONS

(71) Applicant: Oracle International Corporation, Redwood Shores, CA (US)

(72) Inventors: Sungpack Hong, Palo Alto, CA (US); Siegfried Depner, Augsburg (DE); Thomas Manhardt, Foster City, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/876,075

(22) Filed: Oct. 6, 2015

(51) Int. Cl.
  *G06F 9/46* (2006.01)
  *G06F 9/50* (2006.01)
  *G06F 9/48* (2006.01)

(52) U.S. Cl.
  CPC ........... *G06F 9/5083* (2013.01); *G06F 9/4881* (2013.01)

(58) Field of Classification Search
  None
  See application file for complete search history.

(56) References Cited

U.S. PATENT DOCUMENTS

| | | | |
|---|---|---|---|
| 2012/0158858 A1* | 6/2012 | Gkantsidis | H04L 51/22 709/206 |
| 2012/0303685 A1* | 11/2012 | Ulrich | G06F 3/061 707/827 |

\* cited by examiner

*Primary Examiner* — Sisley Kim
(74) *Attorney, Agent, or Firm* — Hickman Palermo Becker Bingham LLP

(57) ABSTRACT

Techniques herein perform workload-balanced graph partitioning. Each graph partition is distributed to a respective computer. Each computer applies a workload-estimation function to its partition to calculate a numeric workload-value that indicates how much computation the partition needs. Each computer sends its numeric workload-value to a master computer. The master compares the highest and lowest numeric workload-values. If the difference exceeds a threshold, the master detects how much work should over-loaded-computers offload to under-utilized computers. To each overloaded-computer, the master sends a directive with a balancing numeric workload-value that indicates how much computation to offload and an identifier of an under-utilized computer to receive the offload. Based on this directive and the workload-estimation function, an over-loaded-computer selects a portion of its partition that corresponds to the balancing numeric workload-value, removes that portion from its partition, and transfers the portion to the under-utilized computer, which adds the portion to its partition.

20 Claims, 6 Drawing Sheets

GRAPH-DATA PARTITIONING FOR WORKLOAD-BALANCED DISTRIBUTED COMPUTATION WITH COST ESTIMATION FUNCTIONS

FIELD OF THE DISCLOSURE

This disclosure relates to distributed graph processing. Techniques of graph partitioning for optimal workload balancing are presented.

BACKGROUND

Graph analytics is a field of data analysis where the underlying dataset is represented as a graph of vertices interconnected by edges. Some applications analyze huge graphs of millions or billions of vertices and edges. In order to process huge data sets that do not fit in a single memory, systems that support distributed graph processing are actively pursued by academia and industry. In these systems, graph data is spread over many machines that are connected through a network fabric.

The performance of distributed graph analyses, however, may be significantly affected by how the graph data is partitioned across computers, where each computer processes one graph partition. The number of edges that cross between partitions, thereby crossing machine boundaries, may determine the amount of communication between machines. Therefore, it is desirable to partition a graph in a way that minimizes the total number of partition-crossing edges.

The number of edges within a partition typically determines the amount of work done by a machine. Moreover, a local edge, that connects vertices within the same partition, requires a different amount of processing than does a remote edge, that joins partitions. It is desirable to partition a graph in a way that each machine has an equal workload. Thus, there may be a tension between equally partitioning all edges and equally minimizing remote edges. This tension may be treated as an optimization problem.

Equal division of all edges may have a big impact on the performance of distributed graph processing. If the workload is not equally distributed, then overloaded machines may become a bottleneck for system throughput. Although an equal division of all edges may be straightforward, such partitioning may often be suboptimal.

Various approaches may instead focus primarily on minimizing remote edges, which is a NP-hard problem. These systems often rely on external partitioning tools, such as ParMetis, or use heuristic techniques. However, due to the complexity and scale of large real-world graphs, these approaches may fail to achieve their goal of minimizing remote edges.

Another problem with various approaches is that they may attempt to solve the partitioning optimization problem without using distributed computing until after partitioning. For example, GraphLab has a sophisticated partitioning algorithm, but no ability to exploit multiple computers while performing that algorithm. As a result, partition optimization itself may become a bottleneck, even before actual graph analytics can begin. Furthermore, when a central computer performs partitioning of an entire graph, it is unlikely that the graph may fit within the physical memory of the central computer, thereby thrashing virtual memory and decreasing throughput.

DETAILED DESCRIPTION

Figure 1:
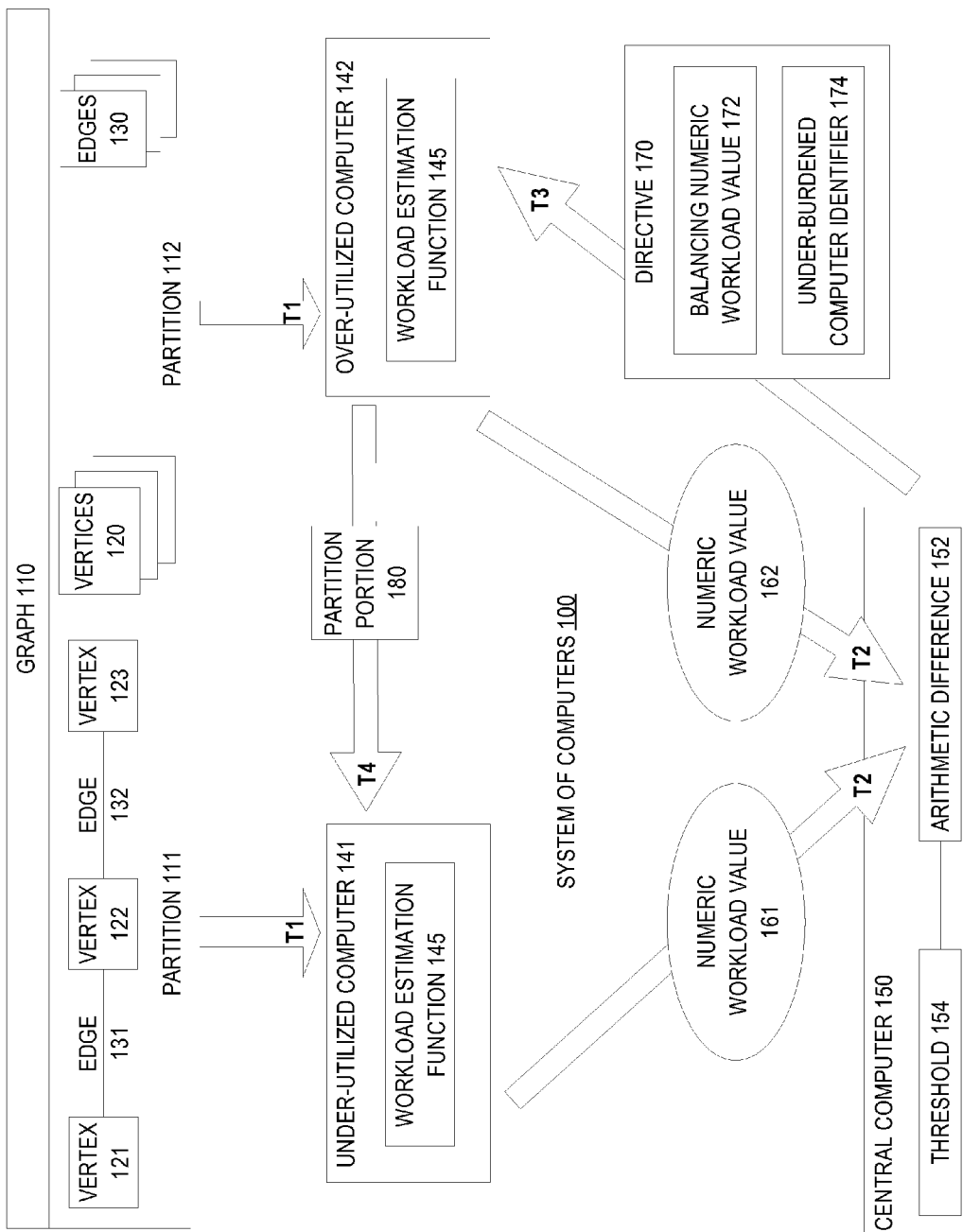
FIG. 1 is a block diagram that depicts an example workload balancing system architecture, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
 2.0 Computer System Overview
  2.1 Example System Architecture
  2.2 Example System Behavior
   2.2.1 Initial Partition Distribution
   2.2.2 Iterative Balancing
   2.2.3 Convergence
 3.0 Example Balancing Process
  3.1 Preparation
  3.2 An Iteration
  3.3 Amdahl's Law
  3.4 Repeated Iteration
 4.0 Workload Estimation Function
  4.1 Logical Cost
  4.2 Topological Cost
  4.3 Environmental Cost
  4.4 Computational Cost
 5.0 Training
  5.1 Regular Graph
  5.2 Solving Weights
 6.0 Ghost Vertices
 7.0 Data Locality
 8.0 Hardware Overview 1.0 General Overview Computerized techniques are provided for graph-data partitioning for workload-balanced distributed computation with cost estimation functions. In an embodiment, a graph is divided into initial partitions before iterative workload balancing begins. Each partition has vertices that are interconnected by edges. Each initial partition is distributed to a respective computer.

After receiving their respective partitions, the computers are ready to begin iterative workload balancing. Each balancing iteration proceeds as follows.

Each computer applies a workload estimation function to its own partition to calculate a numeric workload value. The numeric workload value indicates how much computation would be needed to perform graph analytics on the partition.

There is one central computer, to which each computer sends its numeric workload value. The central computer calculates the arithmetic difference between the highest numeric workload value and the lowest numeric workload value.

The central computer detects whether or not the arithmetic difference exceeds a convergence threshold. If the arithmetic difference falls below the convergence threshold, then the workload balancing has converged on a nearly optimal partitioning, in which case iterative balancing may cease and actual graph analytics may start.

If the arithmetic difference still exceeds the convergence threshold, then the central computer calculates the arithmetic mean of the numeric workload values. Then, by calculating the difference between that mean and the numeric workload value of each computer, the central computer detects which computers are overloaded, how much work should the overloaded computers offload, and to which under-utilized computers should the overloaded computers offload work.

To each overloaded computer, the central computer sends a directive that includes a balancing numeric workload value that indicates how much computation to offload and an identifier of an under-utilized computer to which the offloaded work should be transferred. Upon receiving this directive and based on the workload estimation function, an overloaded computer selects a portion of its own partition that corresponds to the balancing numeric workload value of the directive. The overloaded computer removes that portion from its partition.

The overloaded computer transfers that portion to the under-utilized computer that is identified in the directive. Upon receiving that portion, the under-utilized computer adds the portion to its own partition.

2.0 Computer System Overview

FIG. 1 is a block diagram that depicts an example system of computers 100, in an embodiment. System of computers 100 uses a cost estimation function to rebalance workloads before or perhaps during distributed processing of a graph computation. System of computers 100 includes central computer 150, utilized computers 141-142, and graph 110.

Graph 110 may be a directed graph, an undirected graph, a cyclic graph, or an acyclic graph. Graph 110 may be configured as one or more data structures that occupy memory or durable storage.

Graph 110 is composed of vertices, such as vertices 120-123, which are interconnected by edges, such as edges 130-132. Graph 110 may have a multitude of vertices and edges, perhaps billions. Because of the potential size of graph 110, applying graph analytics to graph 110 using only one computer may be too slow. That one computer may have too small a memory address space to entirely load graph 110. As such, acceleration and horizontal scaling may be achieved by distributing the graph analytics to many computers, perhaps gathered in a cluster.

2.1 Example System Architecture

For example, the graph analytics may be distributed to utilized computers 141-142. Utilized computers 141-142 and central computer 150 may each be a rack server such as a blade, a personal computer, a mainframe, or other networked computer. Utilized computers 141-142 communicate with each other and with central computer 150 over any communication fabric, such as a local area network or the global internet.

A graph partition is a subset of the vertices of a graph and the edges that interconnect those vertices, as shown in partition 111. The vertices of a partition may be stored in an array, shown as vertices 120 in partition 112. The edges may be stored in another array, shown as edges 130 in partition 112.

In preparation for graph analytics, graph 110 is logically partitioned into as many partitions as are available computers. For example, partitions 111-112 correspond to utilized computers 141-142. Any number of computers may participate in the graph analytics. Depending on the implementation, there may or may not be a partition for central computer 150. That is, central computer 150 may or may not participate in the graph analytics as a utilized computer.

2.2 Example System Behavior

FIG. 1 portrays both structure and behavior of system of computers 100. The behaviors of system 100 are shown by arrows. These behaviors occur in a sequence of times T1-T4, which mark the arrowheads.

2.2.1 Initial Partition Distribution

At time T1, each utilized computer 141-142 gets its respective partition 111 or 112. This distribution of partitions may occur along a computer network, over which either a copy of the vertices and edges of each partition, or references to the vertices and edges, may be transferred to corresponding utilized computers. For example, graph 110 may be stored in a cross-mounted file system that is accessible by all involved computers 141-142 and 150.

In this case, central computer 150 may logically divide graph 110 into partitions 111-112 and then distribute identifiers of vertices of a partition to each of utilized computers 141-142. Utilized computers 141-142 may use those identifiers to retrieve particular vertices from a cross-mounted file that contains graph 110.

Initial division of graph 110 may involve a deterministic or heuristic partitioning algorithm. For example, an initial division may attempt to minimize the count of edges that interconnect different partitions. Alternatively, the initial division may be naïve or expedient. For example, if all of the vertices of graph 110 occupy an array, then each partition may have an equally sized subrange of that array.

The quality of the initial partition is not essential, because workload balancing will subsequently be applied to refine the partitioning. Such refinement is based on workload estimation function 145, which is shared by all utilized computers 141-142. When each computer of utilized computers 141-142 receives its partition, that computer applies workload estimation function 145 to its own partition to estimate the effort needed to perform the graph analytics on the partition.

Workload estimation function 145 analyzes various factors to calculate a numeric workload value that indicates an amount of computation to be performed by a utilized computer to process its partition. The numeric workload value depends on the size and complexity of a partition. For example, a partition with more edges interconnecting to other partitions may be more complicated than a partition with fewer edges to other partitions. Example workload estimation functions are discussed later herein.

2.2.2 Iterative Balancing

After initial distribution of partitions, system of computers 100 iteratively balances the workload of the utilized computers by redistributing portions of graph 110 from some partitions to other partitions. This iterating repeats until an evenly distributed workload is achieved.

At time T2, each utilized computer 141-142 sends its respective numeric workload value 161-162 to central computer 150 for consideration. In practice, centralize computer 150 receives many numeric workload values from many utilized computers that share in the processing of graph 110.

An evenly distributed workload is achieved when all of utilized computers 141-142 have respective graph partitions that require the same amount of processing during graph analytics. Central computer 150 recognizes a well-balanced workload when numeric workload values 161-162 are within a range that does not exceed threshold 154.

For example, numeric workload values may be measured as minutes of processing, with values for partitions 111-112 being 20 minutes for numeric workload value 161 and 25 minutes for numeric workload value 162. The 20 and 25 minute values span a range of five minutes, which is the highest value of 25 minus the lowest value of 20, shown as arithmetic difference 152.

If arithmetic difference 152 is five minutes, and threshold 154 is ten minutes, then threshold 154 is not exceeded, and a well-balanced workload is achieved. However if threshold 154 is exceeded, then workload balancing must be performed.

When threshold 154 is exceeded, central computer 150 calculates how much partition processing workload should be transferred between which utilized computers. For example, central computer 150 may calculate the mean of numeric workload values 161-162 to determine balancing numeric workload value 172, which is the amount of workload that over-utilized computer 142 should transfer to under-utilized computer 141.

Workload balancing is accomplished by transferring a portion of a partition from over-utilized computer 142 to under-utilized computer 141. However, central computer 150 does not determine and does not tell over-utilized computer 142 which vertices to transfer. Instead, central computer 150 merely tells over-utilized computer 142 what amount of processing to offload, without regard to how that amount of processing corresponds to some amount of transferable vertices.

Central computer 150 accomplishes this at time T3 by sending directive 170 to over-utilized computer 142. Central computer 150 may send a respective directive to each of many over-utilized computers that have partitions of graph 110.

Directive 170 includes under-burdened computer identifier 174 and balancing numeric workload value 172. Balancing numeric workload value 172 designates an amount of transferable work that over-utilized computer 142 should offload. Specifically, balancing numeric workload value 172 indicates an amount a graph analytical processing, which may be measured in units of wall clock time or CPU cycles. Under-burdened computer identifier 174 identifies to which other utilized computer should over-utilized computer 142 offload that transferable work.

For example, directive 170 may tell over-utilized computer 142 to remove from graph partition 112 an amount of vertices that would need two and a half minutes of analytics time. How many vertices can be processed in two and a half minutes depends on the complexity of the graph analytics, the topology of vertices and edges within partition 112, the amount of edges that interconnect with other partitions, and perhaps other factors.

Upon receiving directive 170, over-utilized computer 142 selects a subset of vertices from within graph partition 112 for offloading. Over-utilized computer 142 applies workload estimation function 145 to the vertex subset to estimate how much processing time would that subset require for graph analytics.

If the estimated time significantly exceeds balancing numeric workload value 172, then the vertex subset is too big, in which case over-utilized computer 142 may remove some vertices from the subset and then apply workload estimation function 145 again. If the estimated time is significantly less than balancing numeric workload value 172, then over-utilized computer 142 may add additional vertices to the subset.

Eventually over-utilized computer 142 selects a vertex subset that is estimated to need roughly the amount of processing that is indicated by balancing numeric workload value 172. Over-utilized computer 142 logically removes the vertex subset, along with involved edges, from graph partition 112.

At time T4, over-utilized computer 142 transmits the vertex subset, shown as partition portion 180, to under-utilized computer 141 as identified by under-burdened computer identifier 174. Transfer of partition portion 180 may involve sending either a copy of the vertices and edges of partition portion 180 or references to those vertices and edges.

If over-utilized computer 142 is especially overloaded, then over-utilized computer 142 may receive multiple directives 170 to offload portions to multiple under-utilized computers. If under-utilized computer 141 is especially under loaded, then it may receive a partition portion 180 from each of multiple over-utilized computers.

Upon receiving partition portion 180, under-utilized computer 141 logically adds portion 180 to graph partition 111. This concludes one iteration of workload balancing, at which time another iteration may begin with utilized computers 141-142 applying workload estimation function 145 to respectively modified partitions 111-112 and transmitting numeric workload values 161-162 at a next time T2.

2.2.3 Convergence

Iterating continues until arithmetic difference 152, between the most and least utilized computers, falls below threshold 154, such that convergence is achieved. Iterative balancing is not guaranteed to converge. If convergence does not occur after some fixed count of iterations, then central computer 150 may decide that convergence is unattainable within a reasonable time, if ever. If central computer 150 decides such, then central computer 150 may cease iterating as if convergence had hypothetically occurred.

After convergence, the workload is well balanced. At this time, utilized computers 141-142 may begin performing graph analytics. During graph analytics, the workload may become imbalanced. For example, peculiarities of the analytics may cause analysis of some vertices or edges to become very expensive or inexpensive. Alternatively, other local applications or network weather may cause a workload imbalance. System of computers 100 may be configured to detect a workload imbalance, suspend graph analytics, and again do iterative workload balancing as described above before resuming graph analytics.

3.0 Example Balancing Process

Figure 2:
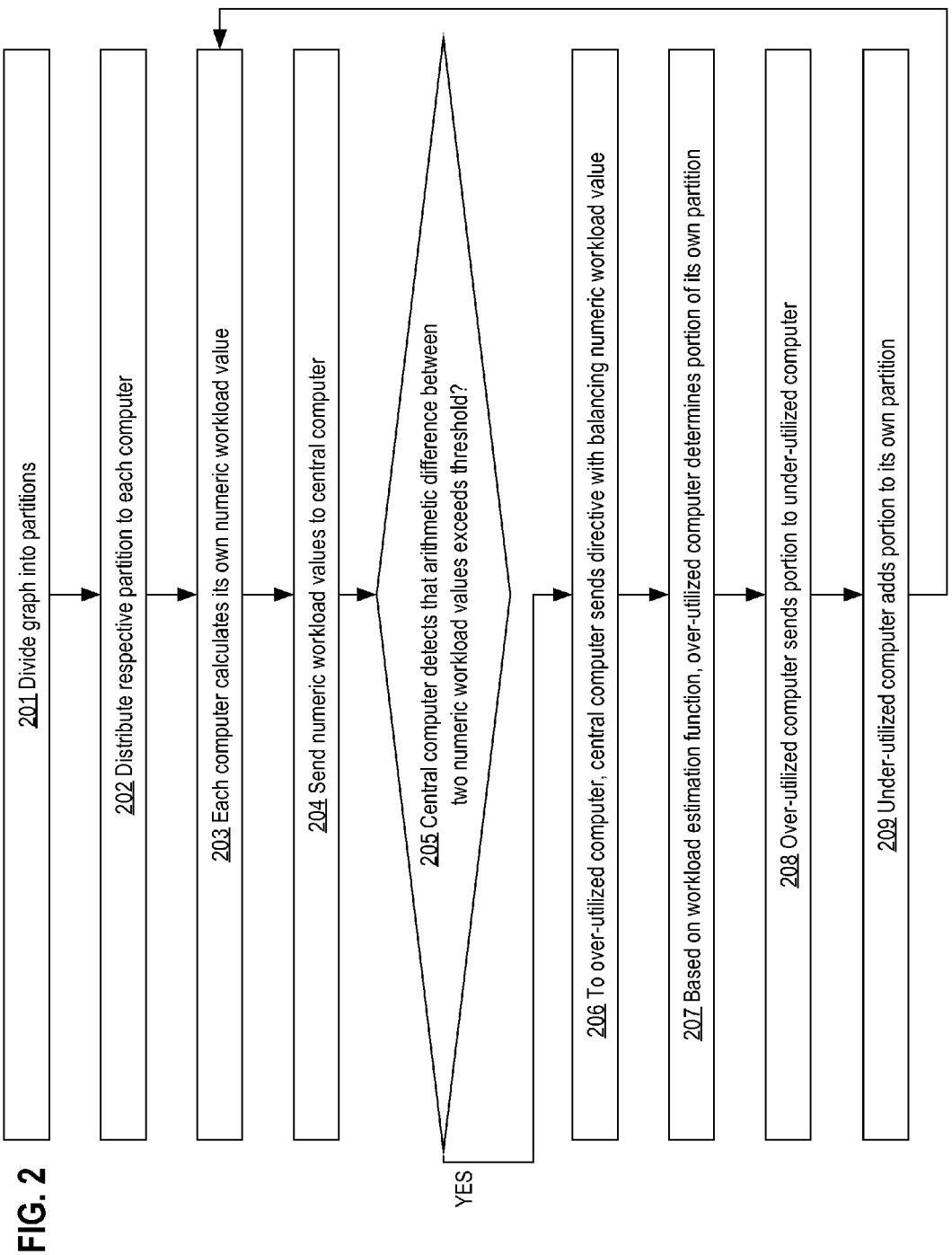
FIG. 2 is a flow diagram that depicts an example workload balancing process, in an embodiment.

FIG. 2 is a flow diagram that depicts an example balancing process, in an embodiment. The balancing process is described in the context of FIG. 1.

3.1 Preparation

Some preparatory steps occur before iterative balancing. Step 201 divides a graph into initial partitions to be allocated to computers. For example, system of computers 100 divides graph 110 into partitions 111-112.

Initial partitioning may be centrally performed, perhaps by central computer 150. Alternatively, each of utilized computers 141-142 may each self-allocate a respective partition, perhaps by taking equally sized partitions. The quality or evenness of initial partitioning is not necessarily important, because iterative balancing should remedy an initial imbalance cause by naïve partitioning.

Step 202 distributes a partition to each utilized computer. For example, central computer 150 may transmit the contents or bounds of a partition to each of utilized computers 141-142. Transfer of a partition may involve sending either a copy of the vertices and edges of the partition or references to those vertices and edges.

For example, a utilized computer may receive metadata that lists the vertices and edges of a partition. Such metadata may include indices into a global array of the vertices or edges of graph 110. Alternatively, central computer 150 does not participate in initial partitioning, and utilized computers 141-142 autonomously access their respective partitions, such as by reading respective portions of a cross-mounted file that contains graph 110.

3.2 An Iteration

Iterative balancing involves steps 203-209. Each utilized computer calculates the numeric workload value of its own partition during step 203. For example, utilized computers 141-142 apply workload estimation function 145 to their respective partitions to estimate how much processing time would graph analytics need to process the respective partition.

Workload estimation function 145 may integrate various factors that affect processing time. Some of the factors may regard the partition, such as a count of vertices or edges. Some of the factors may regard the graph analysis algorithm, such as its computational complexity. Some of the factors may be infrastructural, such as CPU caliber or network topology. Some of the factors may be environmental, such as network weather or data center load.

The utilized computers send their numeric workload values to the central computer during step 204. For example, utilized computers 141-142 send numeric workload values 161-162 to central computer 150.

In step 205, the central computer detects whether or not convergence is achieved. Convergence occurs when the difference between the lowest and highest numeric workload values falls below a convergence threshold.

For example, central computer 150 receives numeric workload values 161-162 and subtracts the lowest value from the highest value to calculate arithmetic difference 152. Central computer 150 compares arithmetic difference 152 with threshold 154.

Central computer 150 uses this comparison to decide whether convergence is achieved. If arithmetic difference falls within threshold 154, then convergence is achieved. When convergence is detected, iterative balancing ceases, and utilized computers 141-142 may begin graph analytics of their respective modified partitions. For example, central computer 150 may notify utilized computers 141-142 to begin graph analytics.

When convergence is achieved, the workload is well balanced, and all of numeric workload values 161-162 are similar, any of which may be used as a final estimate of how long will the actual graph analytics take to perform. This may be useful for configuring a visual progress bar to show during the graph analytics.

However, if arithmetic difference 152 still exceeds threshold 154, then convergence has not occurred, and system of computers 100 proceeds to step 206. In step 206, the central computer sends a respective balancing directive to each over-utilized computer.

For example based on numeric workload values 161-162, central computer 150 may decide that some work, in the amount of balancing numeric workload value 172, should be transferred from over-utilized computer 142 to under-utilized computer 141. Central computer 150 sends directive 170 to over-utilized computer 142 to trigger the transfer. Central computer 150 may send other directives to other over-utilized computers.

In step 207, the over-utilized computer determines how much of its own partition to offload to an under-utilized computer. For example, over-utilized computer 142 selects a subset of vertices of graph partition 112 to offload to under-utilized computer 141. Over-utilized computer 142 applies workload estimation function 145 to the vertex subset to estimate how much graph processing does the vertex subset need.

If the estimate differs significantly from balancing numeric workload value 172, then over-utilized computer 142 adjusts the vertex subset by adding or removing vertices until workload estimation function 145 gives a value that is substantially similar to balancing numeric workload value 172.

In step 208, the over-utilized computer offloads a portion of its partition by sending the portion to an under-utilized computer. For example, over-utilized computer 142 logically removes partition portion 180 from graph partition 112. Logical removal may entail updating metadata that indicates which vertices and edges belong to partition 112.

Under-burdened computer identifier 174 designates to which under-utilized computer should over-utilized computer 142 send partition portion 180. Depending on the implementation, over-utilized computer 142 transfers partition portion 180 by copy or by reference to under-utilized computer 141.

In step 209, the under-utilized computer receives the transferred portion and adds it to its own partition. For example, under-utilized computer 141 receives partition portion 180 and adds it to graph partition 111. There may be multiple under-utilized computers receiving partition portions, and an under-utilized computer may receive a portion from each of multiple over-utilized computers.

3.3 Amdahl's Law

Steps 205-206 involve sequential processing by the central computer. Whereas Steps 203-204 and 207-209 are each performed by many utilized computers in parallel. As such, a balancing iteration involves alternation between sequential and parallel processing.

Thus, Amdahl's law is relevant, which says that speedup by horizontal scaling is limited by the amount of sequential processing. Therefore, care should be taken to keep sequential steps 205-206 as lean as possible. Conversely, if the sequential steps were to dominate the execution time of a balancing iteration, then the diminished benefits of adding more utilized computers would not justify the capital expenditure.

3.4 Repeated Iteration

After step 209, one balancing iteration is complete and another iteration may start. However, there may be special processing between iterations. For example, central computer 150 may decide that convergence is infeasible and cease iterating after a fixed count of iterations.

The next iteration begins with step 203 again. However, some synchronization may need to occur after step 209 and before step 203. For example if under-utilized computer 141 should receive partition portions from multiple over-utilized computers, then it would be erroneous for under-utilized computer 141 to begin another iteration before receiving all partition portions.

As such, some or all utilized computers may wait at a synchronization barrier after step 209 until central computer 150 signals that the next iteration begins. Alternatively during step 206, central computer 150 may inform underutilized computer 141 as to how many partition portions to receive during the current iteration.

4.0 Workload Estimation Function

Figure 3:
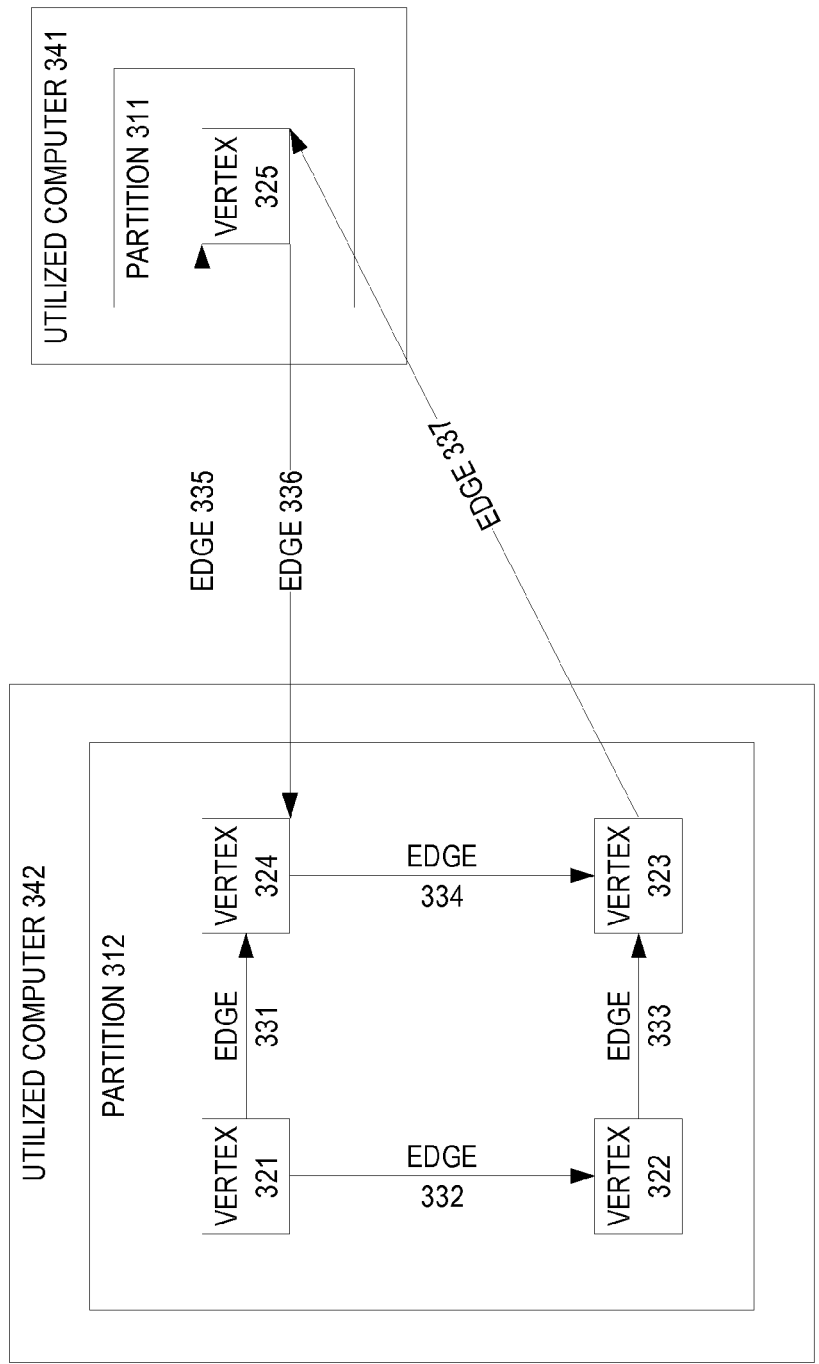
FIG. 3 is a block diagram that depicts an example computer cluster, in an embodiment.

FIG. 3 is a block diagram that depicts an example computer cluster 300, in an embodiment. Computer cluster 300 may be an implementation of system of computers 100. The utilized computers of cluster 300 apply a workload estimation function of increased accuracy with integration of highly relevant factors. The workload estimation function may integrate many terms. The terms may be weighted.

4.1 Logical Cost

Computer cluster 300 includes utilized computers 341-342, which may be any networked computers capable of graph analytics. Utilized computers 341-342 have respective graph partitions 311-312.

The CPU cycles needed for graph analytics of a partition depends on the size and internal complexity of the partition. For example, the workload estimation function of utilized computers 341-342 may depend on the size of the partition by integrating a weighted count of vertices of the partition, such as vertices 321-324 of partition 312. The workload estimation function may depend on the internal complexity of the partition by integrating a weighted count of edges that are internal to the partition, such as edges 331-334 of partition 312.

A powerful server may have many processors. Each processor may have many cores. To exploit such hardware, a graph algorithm may process many vertices in parallel. In some cases, all of the vertices of a partition may be processed in parallel. As such, the weight given by the workload estimation function to the count of vertices may be decreased, perhaps to nearly zero.

4.2 Topological Cost

Graph analytics may involve individually processing edges and vertices. Processing an edge may involve accessing values associated with the two vertices that it connects. Processing a vertex may involve accessing values associated with its edges or the neighboring vertices that are connected to those edges.

Logically, partitions are insignificant and arbitrary divisions of a graph. However, accessing values of connected edges and neighboring vertices may incur extraordinary latency when edges cross between two partitions. Latency arises because partitions occupy utilized computers that are separated by a local area network or an internetwork. As such, accessing values between interconnected partitions may involve network communication.

The workload estimation function may account for network latency in various ways. The workload estimation function may depend on a weighted count of edges that cross the boundary of the partition, such as edges 335-337. If processing costs associated with an edge depend on the direction of the edge, then the workload estimation function may depend on separate weighted counts of inbound edges and outbound edges that cross the partition boundary, such as inbound edge 336 and outbound edges 335 and 337 of partition 312.

Network latency may depend on the amount of data transferred. The workload estimation function may depend on separate weighted averages of the amount of remote data expected to be accessed for inbound edges and outbound edges that cross the partition boundary.

4.3 Environmental Cost

Network capacity and weather can affect network latency. The workload estimation function may depend on the weighted bandwidth of one or many computer networks. Standardized network technology, such as Infiniband or gigabit Ethernet, may have standardized bandwidth.

4.4 Computational Cost

Graph analytics may be compute-bound or otherwise CPU intensive. The workload estimation function may depend on the weighted computational complexity of processing a vertex or edge. Such computational complexity may depend on the application specifics of the graph analytics algorithm.

A graph analytics job may perform multiple graph analytics algorithms on the same graph. The workload estimation function may depend on the weighted computational complexity of each of the multiple analytics algorithms.

The costs of the algorithms may be weighted according to the frequency that each algorithm is invoked. For example, one algorithm may apply to edges, and another algorithm may apply to vertices. In such a case if a graph has twice as many edges as vertices, then the edge algorithm may have double the weight of the vertex algorithm.

Algorithmic complexity may be measured in various ways. The complexity of application source code may be characterized according to an asymptotic complexity notation, such as big O notation. A high level language compiler, a domain specific language (DSL) compiler, a static analysis tool, or a person may determine the asymptotic complexity of application source code. The workload estimation function may depend on the weighted asymptotic complexity of a graph algorithm.

Algorithmic complexity may depend on a count of machine instructions of object code, such as Java bytecode or other compiled binaries. The workload estimation function may depend on the weighted instruction count of a graph algorithm.

The most accurate measurement may be a dynamic count of executed instructions during performance of the graph algorithm. A dynamic instruction count may be obtained by an execution profiler.

A static count of instructions may be obtained by a disassembler or a decompiler. Absent any tooling, the size of a class file, a jar file, a code library, or an executable may be used as a proxy for a static instruction count. Because static and dynamic counts measure different quantities, their associated weight within the workload estimation function may be different.

5.0 Training

The accuracy of the workload estimation function depends on the weights of the terms. The weights may be tuned to increase accuracy. Tuning may occur during a training phase, during which graph analytics are performed under certain conditions.

The conditions may depend on various factors. A factor can be disturbed to see how great is the impact on performance, which can then be used to adjust the weight of that factor.

For example, if a change in graph size cause a big change in the time required for graph analytics, then the weight of the term for vertex count may be increased. Conversely, if adjusting graph size does not substantially impact processing time needed, then the weight of the term for vertex count may be decreased.

Training may be scientific, such that only one term is altered during each training run of the graph analytics, and the other terms are held constant. Over the course of several training runs, all of the term can be adjusted, one by one, by various amounts. Such training should eventually converge on highly accurate weights.

5.1 Regular Graph

Training under abnormal conditions may be reduce the accuracy of the weights. To avoid naturally occurring idiosyncrasies, such as a realistically lopsided graph, instead training may use an unnaturally regular graph.

A regular graph is straightforward to programmatically generate. Graph generation may involve generating similar partitions that have a same amount of vertices, a same amount of internal edges, and a same amount of inbound or outbound external edges. These amounts may be parameters that are input into a regular graph generation routine.

5.2 Solving Weights

After all training runs, the actual values of adjusted terms and measured execution times may be arranged in a matrix or other system of linear equations. Using various methods, these equations may be solved to calculate optimal weights for the terms. For example, linear regression may be used for equation solving.

6.0 Ghost Vertices

Figure 4:
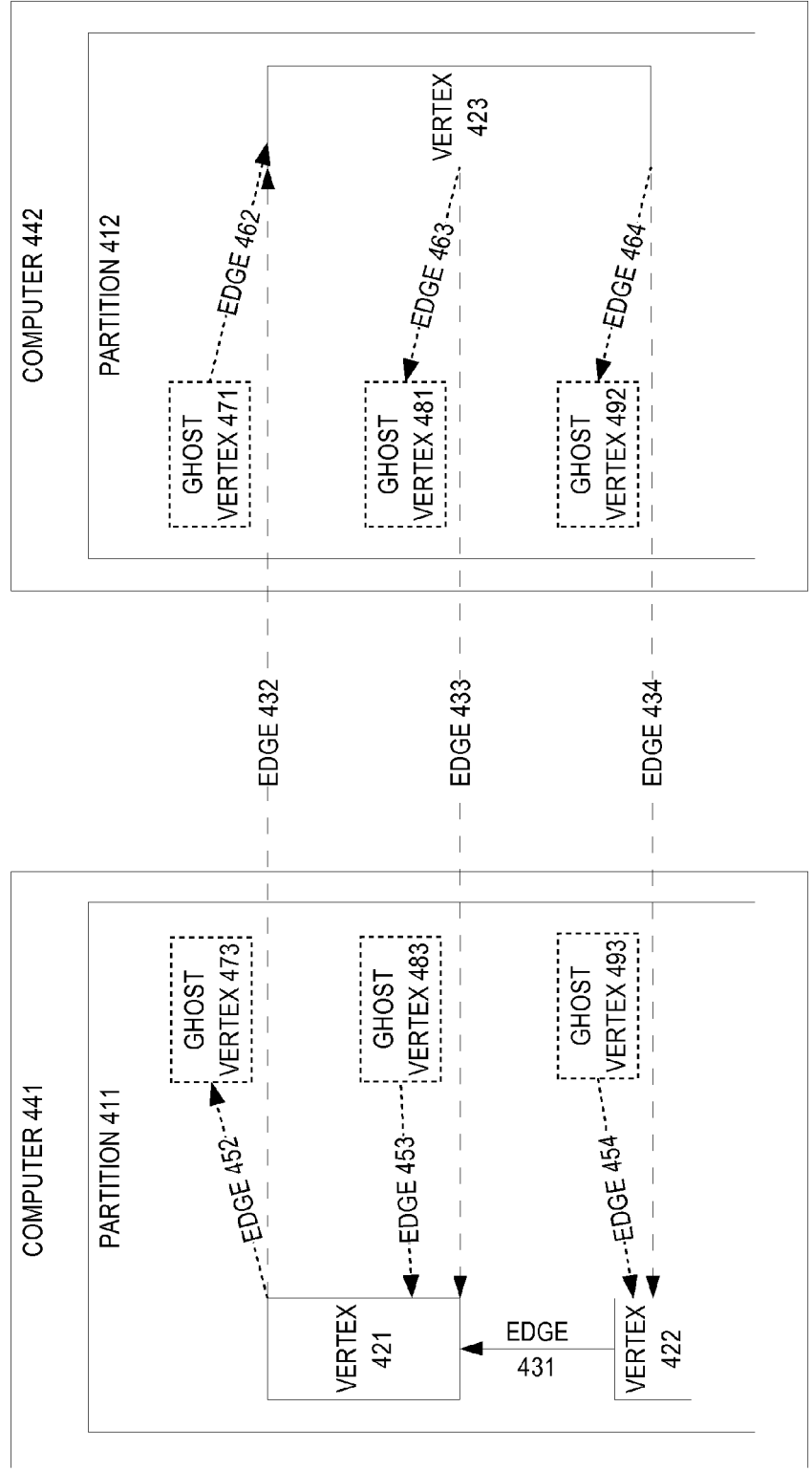
FIG. 4 is a block diagram that depicts an example computer cluster, in an embodiment.

FIG. 4 is a block diagram that depicts an example computer cluster 400, in an embodiment. Computer cluster 400 may be an implementation of system of computers 100. Computer cluster 400 minimizes network latency by eliminating the need to access vertices of other partitions.

This is accomplished by inserting ghost vertices. Ghost vertices may be added during a balancing iteration or after iterative balancing converges. If ghost vertices are used during iterative balancing, then transfer of vertices from one partition to another may be accompanied by the addition or removal of ghost vertices.

Computer cluster 400 includes utilized computers 441-442, which have respective graph partitions 411-412. These partitions are joined together by external edges 432-434, whose processing might ordinarily impose network latency on the graph analytics.

However, computer cluster 400 eliminates this network latency by removing external edges 432-434 and inserting a ghost vertex and internal edge in both partitions of each external edge removed. For example, edge 432 is removed and replaced with ghost vertex 473 and ghost edge 452 in partition 411. Likewise, removal of the same edge 432 is replaced by ghost vertex 471 and ghost edge 462 in partition 412.

As such, removal of one edge causes replacement with two ghost vertices and two ghost edges in total in two partitions. Both ghost edges correspond to the same removed edge.

However the two ghost vertices do not correspond to the same vertex. Ghost vertex 473 in partition 411 corresponds to vertex 423 in partition 412. Whereas, ghost vertex 471 in partition 412 corresponds to vertex 421 in partition 411.

In other words, a ghost vertex acts as a proxy for a vertex in a different partition. To act as such, the ghost vertex must provide the graph analytics with the same data as the vertex for which the ghost vertex is a proxy. For example, because ghost vertex 473 corresponds to vertex 423, during graph analytics ghost vertex 473 must provide the same data to its neighboring vertices in partition 411 as vertex 423 provides to its neighboring vertices in partition 412.

7.0 Data Locality

The memory hierarchy of a utilized computer may be relevant to high performance computing. For example, CPU speeds are increasing at 55% yearly, while main memory speeds are increasing at only 10% yearly. This discrepancy has given rise to a so-called "memory wall" that penalizes a data set that does not fit within a CPU cache.

Reducing partition size by horizontal scaling is one way to fit a graph partition within a CPU cache. Another way is to increase the density or compactness of the partition. A naïve partitioning that assigns each vertex to a partition in a round robin or random fashion would result in poor data locality within a partition.

An implementation may store the vertices of a whole graph in a compact array. The amount of memory needed for the compact array is unaffected by where partition boundaries are drawn. However, a partition consisting of the middle two vertices in the compact array will have a much smaller partition address space than a partition consisting of the first and last vertices in the compact array, even though both partitions have the same amount of vertices.

Furthermore, the more fragmented are the vertices within a partition, the more cache lines are needed for the partition. As such, the data locality of vertices of a partition may determine the address space and cache footprint of a partition.

Fragmentation may be aggravated by iterative balancing. For example, partitions may start with compactly arranged vertices. However, each balancing iteration may somewhat reshuffle the vertices amongst the partitions, thereby causing fragmentation.

Figure 5:
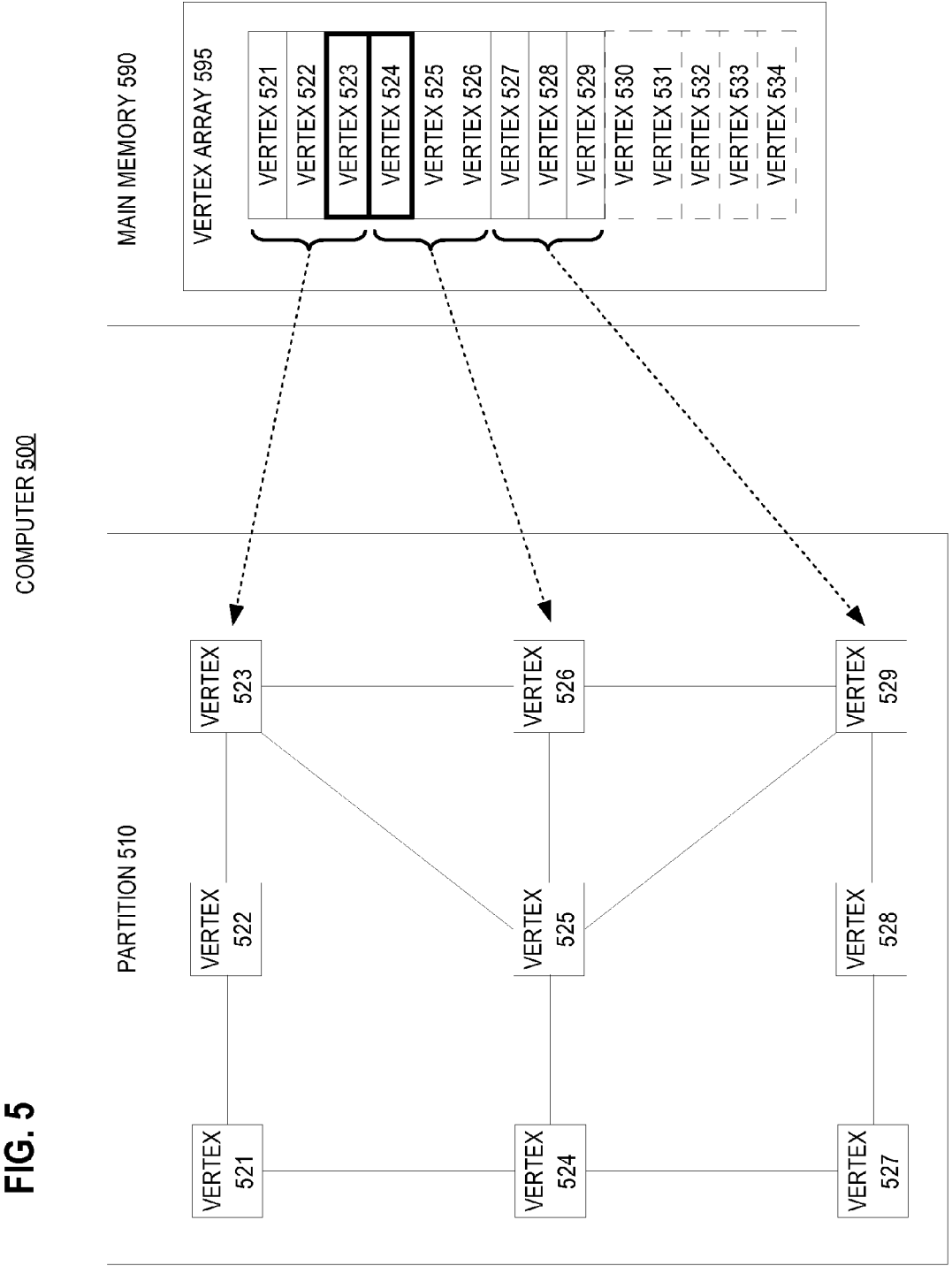
FIG. 5 depicts an example computer, in an embodiment.

FIG. 5 is a block diagram that depicts an example computer 500, in an embodiment. Computer 500 may be an implementation of over-utilized computer 142. Computer cluster 500 considers data locality when adjusting partitions.

Computer 500 includes graph partition 510 and main memory 590. Main memory 590 may be a random access memory (RAM) such as a volatile or non-volatile RAM. Main memory 590 may host some or all of a virtual memory.

Main memory 590 includes a range of memory addresses. Vertex array 595 occupies main memory 590. Vertex array 595 is a compact array of all vertices 521-534 in a graph. For example, each of the utilized computers may have a copy of vertex array 595 within their main memories.

Within vertex array 595, vertices are arranged contiguously in memory as shown. Within vertex array 595, vertices 521-529 are drawn with solid lines to show that they belong to partition 510. Vertices 530-534 are drawn with dashed lines to show that they belong to other partitions.

During a balancing iteration, computer 500 selects some of its vertices to transfer to other partitions on other computers. For example, computer 500 may select vertex 523 for transfer, perhaps because it has edges (not shown) to another partition.

Computer 500 is configured to maximize data locality when selecting vertices to transfer. For example if computer 500 needs to transfer another vertex, in addition to vertex 523, then computer 500 may consider data locality when selecting the additional vertex to transfer.

In this example, computer 500 selects vertex 524 as the additional vertex to transfer, because vertex 524 is adjacent within main memory 590 to vertex 523, which is also being transferred. As such, computer 500 transfers vertices 523-524, drawn in bold in vertex array 595.

Computer 500 may decide to transfer vertices 523-524 together, even though these two vertices are not connected to each other by an edge. In other words, physical adjacency within main memory 590 may be unrelated to topological connectivity within a graph.

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
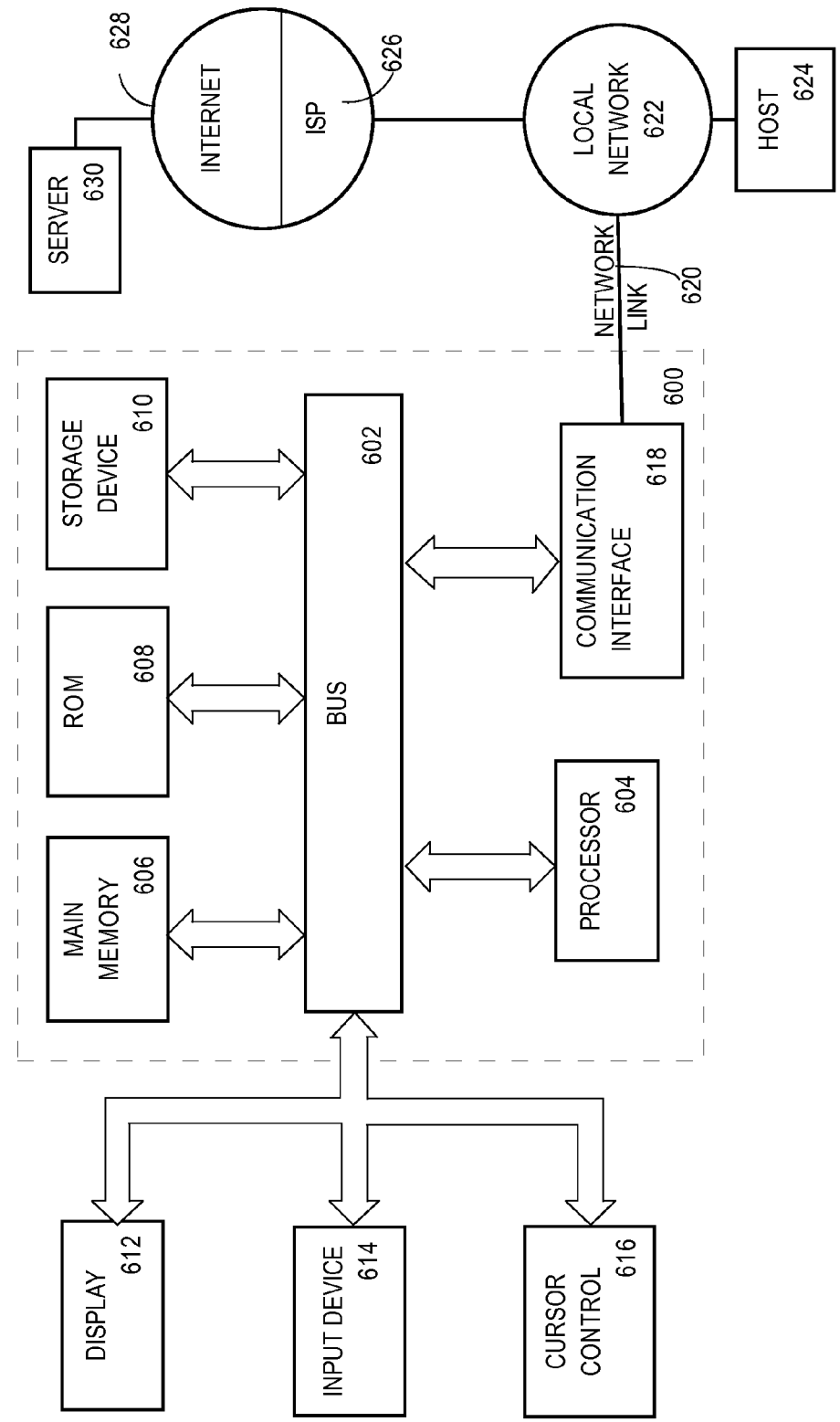
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    dividing a graph into a plurality of partitions, wherein each partition of said plurality of partitions comprises a plurality of vertices that are connected to a plurality of edges;
    distributing, to each computer of a plurality of computers, a respective partition of said plurality of partitions;
    calculating a plurality of numeric workload values, wherein each numeric workload value of said plurality of numeric workload values is associated with a respective computer of said plurality of computers, wherein said each numeric workload value is determined by said respective computer based on a workload estimation function, wherein said each numeric workload value indicates an amount of computation to be performed by said respective computer to process said respective partition;
    sending said plurality of numeric workload values to a central computer, wherein said each numeric workload value is sent by said respective computer;
    detecting, by said central computer, that a difference between two numeric workload values of said plurality of numeric workload values exceeds a threshold;
    sending, by said central computer to an over-utilized computer of said plurality of computers, a directive that includes a balancing numeric workload value that indicates an amount of computation, wherein said directive identifies an under-utilized computer of said plurality of computers;
    determining, by said over-utilized computer and based on said workload estimation function, a portion of said respective partition, wherein said balancing numeric workload value indicates an amount of computation to process said portion;
    removing, by said over-utilized computer, said portion from said respective partition of said over-utilized computer;
    sending, by said over-utilized computer to said under-utilized computer, said portion;
    adding, by said under-utilized computer, said portion to said respective partition of said under-utilized computer.

2. The method of claim 1 wherein said workload estimation function comprises a weighted count of vertices in said respective partition.

3. The method of claim 1 wherein said plurality of edges of said respective partition comprises an internal edge subset, wherein each edge of said internal edge subset connects two vertices that are contained in said plurality of vertices of said respective partition, wherein said workload estimation function comprises a weighted count of edges in said internal edge subset.

4. The method of claim 3 wherein:
    said plurality of edges of said respective partition comprises an inbound edge subset, wherein each edge of said inbound edge subset originates at an original vertex and terminates at a terminal vertex, wherein said plurality of vertices of said respective partition comprises said terminal vertex, wherein said plurality of vertices of said respective partition does not comprise said original vertex, wherein said workload estimation function comprises a weighted count of edges in said inbound edge subset;
    said plurality of edges of said respective partition comprises an outbound edge subset, wherein each edge of said outbound edge subset originates at an original vertex and terminates at terminal vertex, wherein said plurality of vertices of said respective partition comprises said original vertex, wherein said plurality of vertices of said respective partition does not comprise said terminal vertex, wherein said workload estimation function comprises a weighted count of edges in said outbound edge subset.

5. The method of claim 4 wherein a same average amount of data may be transferred for each edge of said plurality of edges, wherein said workload estimation function comprises a multiplicative product of said same average amount times a sum, wherein said sum comprises a sum of said weighted count of edges in said internal edge subset plus said weighted count of edges within one of: said inbound edge subset or said outbound edge subset.

6. The method of claim 4 wherein said weighted count of edges in said outbound edge subset is weighted according to a bandwidth of a standardized computer network technology.

7. The method of claim 1 wherein said workload estimation function comprises a weighted measure of computational complexity to process a vertex.

8. The method of claim 7 wherein said weighted measure comprises a sum of a plurality of measures of computational complexity to process a vertex, wherein each measure of said plurality of measures is based on a computational complexity of a respective different logic, wherein said each measure is weighted according to a respective frequency at which said respective different logic is invoked.

9. The method of claim 7 wherein said measure of computational complexity comprises a count of machine instructions.

10. The method of claim 9 wherein said count of machine instructions is determined by a domain specific language (DSL) compiler.

11. The method of claim 7 wherein process a vertex comprises process all vertices of said plurality of vertices in parallel.

12. The method of claim 1 wherein said workload estimation function comprises weighting coefficients, wherein the method further comprises:

measuring an execution time of processing a plurality of training partitions of a training graph by a plurality of training computers;

determining said weighting coefficients based on said execution time and said plurality of training partitions.

13. The method of claim 12 wherein said training graph is a regular graph, wherein the method further comprises generating said regular graph, wherein each training partition of said plurality of training partitions comprises:
a same amount of vertices;
a same internal amount of internal edges that originate and terminate from inside of said each training partition;
a same inbound amount of inbound external edges that originate from inside of said each training partition and terminate from outside of said each training partition;
a same outbound amount of outbound external edges that terminate from inside of said each training partition and originate from outside of said each training partition;
wherein said same inbound amount and said same outbound amount are identical.

14. The method of claim 13 wherein:
said workload estimation function comprises at least one of: a measure of average computational complexity to process a vertex, an average amount of data that may be transferred for an edge, a count of internal edges that originate and terminate from inside of said each training partition, a count of inbound external edges that originate from inside of said each training partition and terminate from outside of said each training partition, a count of outbound external edges that terminate from inside of said each training partition and originate from outside of said each training partition;
said processing a plurality of training partitions is based on a plurality of parameters that includes at least one of: a measure of average computational complexity to process a vertex and an average amount of data that may be transferred for an edge.

15. The method of claim 14 wherein measuring an execution time comprises measuring an execution time of each processing of a plurality of repeated processings of said plurality of training partitions, wherein said each processing is based on different values of said plurality of parameters.

16. The method of claim 15 wherein:
the method further comprises generating a plurality of linear equations, wherein each linear equation of said plurality of linear equations comprises said execution time of said each processing and at least one of: a measure of average computational complexity to process a vertex, an average amount of data that may be transferred for an edge, an amount of internal edges that originate and terminate from inside of a same training partition, an amount of external edges that originate inside one training partition and terminate in another training partition;
determining said weighting coefficients comprises performing a linear regression based on said plurality of linear equations.

17. The method of claim 1 wherein dividing a graph into a plurality of partitions comprises generating a respective plurality of ghost vertices for each partition of said plurality of partitions, wherein each ghost vertex of said respective plurality of ghost vertices is connected to an edge, within said each partition, that originally connected to a vertex in another partition of said plurality of partitions.

18. The method of claim 1 wherein detecting that a difference between two numeric workload values exceeds a threshold comprises detecting that a repetition count of repeated said detecting does not exceed a repetition threshold.

19. The method of claim 1 wherein determining a portion of said respective partition comprises determining a contiguous subset of said plurality of vertices, wherein said contiguous subset occupies contiguous memory.

20. One or more non-transitory computer readable media storing instructions that include:
first instructions which, when executed by one or more processors, cause dividing a graph into a plurality of partitions, wherein each partition of said plurality of partitions comprises a plurality of vertices that are connected to a plurality of edges;
second instructions which, when executed by one or more processors, cause distributing, to each computer of a plurality of computers, a respective partition of said plurality of partitions;
third instructions which, when executed by one or more processors, cause calculating a plurality of numeric workload values, wherein each numeric workload value of said plurality of numeric workload values is associated with a respective computer of said plurality of computers, wherein said each numeric workload value is determined by said respective computer based on a workload estimation function, wherein said each numeric workload value indicates an amount of computation to be performed by said respective computer to process said respective partition;
fourth instructions which, when executed by one or more processors, cause sending said plurality of numeric workload values to a central computer, wherein said each numeric workload value is sent by said respective computer;
fifth instructions which, when executed by one or more processors, cause detecting, by said central computer, that a difference between two numeric workload values of said plurality of numeric workload values exceeds a threshold;
sixth instructions which, when executed by one or more processors, cause sending, by said central computer to an over-utilized computer of said plurality of computers, a directive that includes a balancing numeric workload value that indicates an amount of computation, wherein said directive identifies an under-utilized computer of said plurality of computers;
seventh instructions which, when executed by one or more processors, cause determining, by said over-utilized computer and based on said workload estimation function, a portion of said respective partition, wherein said balancing numeric workload value indicates an amount of computation to process said portion;
eighth instructions which, when executed by one or more processors, cause removing, by said over-utilized computer, said portion from said respective partition of said over-utilized computer;
ninth instructions which, when executed by one or more processors, cause sending, by said over-utilized computer to said under-utilized computer, said portion;
tenth instructions which, when executed by one or more processors, cause adding, by said under-utilized computer, said portion to said respective partition of said under-utilized computer.

* * * * *